US012602502B2

(12) United States Patent
Veeriah et al.

(10) Patent No.: US 12,602,502 B2
(45) Date of Patent: Apr. 14, 2026

(54) SYSTEM AND METHOD FOR PROVIDING TRUSTWORTHY ACCESS ENFORCEMENT TO MICROSERVICE CONTAINER IMAGES ON ORCHESTRATION PLATFORMS

(71) Applicant: Privafy Inc, Burlington, MA (US)

(72) Inventors: Vijay Sankar Veeriah, Bangalore (IN); Srinivasan Krishnamoorthy, Bangalore (IN); Jayaraj Wilson, Bangalore (IN); Nitin Dwivedi, Bangalore (IN); Kalanithi Srinivasan, Bangalore (IN)

(73) Assignee: Privafy Inc

( * ) Notice: Subject to any disclaimer, the term of this patent is extended or adjusted under 35 U.S.C. 154(b) by 84 days.

(21) Appl. No.: 18/912,668

(22) Filed: Oct. 11, 2024

(65) Prior Publication Data

US 2025/0124157 A1      Apr. 17, 2025

Related U.S. Application Data

(60) Provisional application No. 63/590,008, filed on Oct. 13, 2023.

(51) Int. Cl.
G06F 21/62      (2013.01)
G06F 21/64      (2013.01)
(52) U.S. Cl.
CPC ................................ G06F 21/6218 (2013.01)
(58) Field of Classification Search
CPC .............................. G06F 21/6218; G06F 21/64
(Continued)

(56) References Cited

U.S. PATENT DOCUMENTS 9,836,611 B1    12/2017  Hamlin
10,154,065 B1 *  12/2018  Buchler .............. G06F 21/6218
(Continued)

FOREIGN PATENT DOCUMENTS

EP          3422234 A1      1/2019
WO      WO-2019207500 A1 *  10/2019   ........... G06Q 20/223
(Continued)

OTHER PUBLICATIONS

Guo, Y., Yu, A., Gong, X., Zhao, L., Cai, L., & Meng, D. (2019, August). Building trust in container environment. In 2019 18th IEEE International Conference on Trust, Security and Privacy in Computing and Communications (pp. 1-9). IEEE. (Year: 2019).*

(Continued)

*Primary Examiner* — Philip J Chea
*Assistant Examiner* — Dorianne Alvarado David
(74) *Attorney, Agent, or Firm* — Jason C. Cameron

(57)          ABSTRACT

A system and a method for providing trustworthy access enforcement to one or more microservice container images on one or more orchestration platforms is disclosed. The system generates the one or more microservice container images along with pre-defined hardcoded elements. The system creates a pre-defined hash data and store in one or more key management databases to analyze authenticity and integrity of the one or more orchestration platforms. The system executes the one or more microservice container images on the one or more orchestration platforms for obtaining metadata associated with the one or more orchestration platforms at a time of execution of the one or more microservice container images. The system generates entitlement signature secret (ESS) data of the one or more orchestration platforms to compare with the pre-defined hash data for trustworthy access enforcement of the one or
(Continued)

more microservice container images on the one or more orchestration platforms.

20 Claims, 8 Drawing Sheets

(58) Field of Classification Search
USPC .......................................................... 726/27
See application file for complete search history.

(56) References Cited

U.S. PATENT DOCUMENTS

| | | | | |
|---|---|---|---|---|
| 11,055,428 | B1 * | 7/2021 | Clerget | G06F 21/6209 |
| 11,496,323 | B1 * | 11/2022 | Caceres | H04L 9/3263 |
| 11,748,481 | B1 | 9/2023 | Hamlin | |
| 12,423,324 | B1 * | 9/2025 | Naragoni | G06F 16/2343 |
| 2006/0053216 | A1 * | 3/2006 | Deokar | G06F 15/173 |
| | | | | 709/223 |
| 2011/0154501 | A1 | 6/2011 | Banginwar et al. | |
| 2018/0349610 | A1 | 12/2018 | Gupta et al. | |
| 2020/0004668 | A1 * | 1/2020 | Dwivedi | G06F 11/0718 |
| 2020/0012818 | A1 * | 1/2020 | Levin | G06T 7/0002 |
| 2020/0250074 | A1 * | 8/2020 | Zhang | G06F 9/44 |
| 2020/0379800 | A1 * | 12/2020 | Rohrbach | G06F 9/45558 |
| 2021/0097477 | A1 * | 4/2021 | Zhang | G01N 21/90 |
| 2022/0019455 | A1 * | 1/2022 | Cao | G06F 21/6218 |
| 2022/0121470 | A1 * | 4/2022 | Saxena | H04L 63/20 |
| 2022/0222098 | A1 * | 7/2022 | Srivastava | G06F 9/45558 |
| 2022/0283794 | A1 * | 9/2022 | Wolfson | H04L 9/0822 |
| 2023/0161867 | A1 * | 5/2023 | Feist | G06F 21/552 |
| | | | | 726/26 |
| 2023/0244817 | A1 * | 8/2023 | Knierim | G06F 21/64 |
| | | | | 726/26 |
| 2024/0370310 | A1 * | 11/2024 | Knierim | G06F 9/5027 |
| 2025/0200170 | A1 * | 6/2025 | Knierim | G06F 21/57 |
| 2025/0292253 | A1 * | 9/2025 | Gilchrist | G06F 3/0604 |
| 2025/0323919 | A1 * | 10/2025 | Baker | H04L 63/105 |

FOREIGN PATENT DOCUMENTS

| | | | | |
|---|---|---|---|---|
| WO | WO-2019233805 A1 * | 12/2019 | | H04W 12/06 |
| WO | WO-2020260026 A1 * | 12/2020 | | H04L 9/3234 |

OTHER PUBLICATIONS

Han, S. H., Lee, H. K., Lee, S. T., Kim, S. J., & Jang, W. J. (2020). Container image access control architecture to protect applications. IEEE Access, 8, 162012-162021. (Year: 2020).*

Saxena, V., Saxena, D., & Singh, U. P. (2022, December). Security Enhancement using Image verification method to Secure Docker Containers. In Proceedings of the 4th International Conference on Information Management & Machine Intelligence (pp. 1-5 ). (Year: 2022).*

* cited by examiner

100

200B

200C

200D

300

Generate, by one or more developer hardware units through a container image generation module, the one or more microservice container images along with pre-defined hardcoded elements to identify metadata associated with the one or more orchestration platforms at a time of execution of the one or more microservice container images 302

Create, by the one or more developer hardware units through a hash data creation module, a pre-defined hash data based on at least one of: a registry location of the one or more microservice container images and an updated version of the one or more microservice container images 304

Store, by the one or more developer hardware units through a hardware security module, the created pre-defined hash data along with at least one of: the registry location of the one or more microservice container images and the updated version of the one or more microservice container images in one or more key management databases to analyze authenticity and integrity of the one or more orchestration platforms 306

Execute, by one or more hardware processors through a microservice execution subsystem, the one or more microservice container images on a cluster of master nodes associated with the one or more orchestration platforms 308

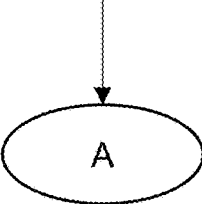

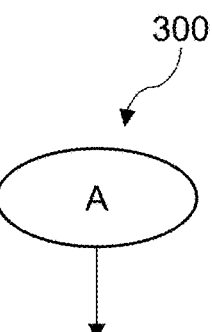

A

Obtain, by the one or more hardware processors through a metadata-obtaining subsystem, the metadata associated with the one or more orchestration platforms at the time of execution of the one or more microservice container images 310

Generate, by the one or more hardware processors through a hash generation subsystem, entitlement signature secret (ESS) data based on hash data of an associated orchestration platform of the one or more orchestration platforms by aggregating the received metadata 312

Perform, by the one or more hardware processors through a signature authentication subsystem, a comparative analysis between the generated entitlement signature secret (ESS) data and the pre-defined hash data, to authenticate an associated orchestration platform of the one or more orchestration platforms as one of: benign and malicious 314

Provide, by the one or more hardware processors through an access control subsystem, one of: access control and deny control based on an outcome of the authentication as one of: the benign and the malicious, for trustworthy access enforcement of the one or more microservice container images on the one or more orchestration platforms 316

SYSTEM AND METHOD FOR PROVIDING TRUSTWORTHY ACCESS ENFORCEMENT TO MICROSERVICE CONTAINER IMAGES ON ORCHESTRATION PLATFORMS

EARLIEST PRIORITY DATE

This Application claims priority from a Provisional patent application filed in the United States of America having Patent Application No. 63/590,008, on Oct. 13, 2023, and titled "SYSTEM AND METHOD FOR SECURING CONTAINER IMAGE ATTESTATION AND PLATFORM VERIFICATION".

TECHNICAL FIELD

Embodiments of the present disclosure relate to microservice container image authentications and orchestration platform identities, and more particularly relate to a computer-implemented system and a computer-implemented method for providing trustworthy access enforcement to one or more microservice container images on one or more orchestration platforms.

BACKGROUND

Microservice orchestration has become increasingly prevalent in modern software development and deployment practices. The microservice orchestration involves managing and coordinating multiple small, independent software components called microservices, which work together to create larger one or more applications. Containerization technology allows one or more end users to package one or more applications as one or more container images, which may be deployed and run consistently across one or more platforms. The one or more container images are stored in container registries that serve as central repositories for hosting and distributing the one or more container images within organizations.

Adoption of cloud-based services has led to the deployment of software on both public cloud infrastructures and private cloud infrastructures. To facilitate automated deployment, scaling, and management of the cloud-based services, virtual machines and one or more orchestration platforms have emerged. The one or more container images have become a common method to deliver software modules to the one or more end users. The one or more container images adhere to standards such as Open Container Initiative (OCI), enabling the one or more end users to run on the one or more orchestration platforms.

However, the widespread use of the one or more container images has introduced new challenges in software licensing and security. Once a user of the one or more end users receives access to a container image of the one or more container images, there are limited mechanisms to prevent the user from copying the container image into the user's own container registry and instantiating the container image on multiple platform instances. This raise concerns that the one or more end users may use the one or more container images beyond licensing terms provided by software providers.

In the existing technology, hardware attestation techniques are disclosed. A system comprises a platform with a processor capable of operating in an isolated execution mode and a persistent storage containing entity information associated with an entity controlling a software application. A security controller generates a platform signature for the software application, including a cryptographic hash of entity information. An attest module provides the platform signature to the software application to verify the platform's association. However, the system is limited in its ability to handle containerized applications operating as independent processes within a user space of a shared host operating system. Isolating the required information for authenticating an application instance running in cloud-based virtualization platforms remains a complex task.

Another existing technology describes the container image that forms a security module container when executed in an associated container execution environment. The security module container is configured to perform cryptographic security functions of a hardware security module and provides the cryptographic security functions to one or more regular software containers via standard container communication interfaces. While this approach enhances the security of the one or more regular software containers, this approach does not directly address the broader problem of authenticating the one or more container images themselves or preventing unauthorized replication and use across multiple orchestration platforms.

These limitations in the prior art underscore critical technical challenges in the authentication, integrity, and licensing enforcement of container images. Traditional authentication systems fail to establish the origin of the one or more container images with the required granularity, and they do not effectively prevent tampering with the one or more container images once they are distributed. Moreover, current access control mechanisms for the one or more container images deployment do not support the fine-grained enforcement necessary to ensure that the one or more container images are used in compliance with licensing terms across multiple orchestration platform instances.

Therefore, there is a need for a system to address the aforementioned issues by providing secure attestation, authentication, and validation of the one or more container images and their associated orchestration platforms in modern microservice orchestration environments.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a computer-implemented method for providing trustworthy access enforcement to one or more microservice container images on one or more orchestration platforms is disclosed.

In an embodiment, the computer-implemented method for providing the trustworthy access enforcement to the one or more microservice container images on the one or more orchestration platforms is disclosed. At the first step, the computer-implemented method includes generating, by one or more developer hardware units through a container image generation module, the one or more microservice container images along with pre-defined hardcoded elements to identify metadata associated with the one or more orchestration platforms at a time of execution of the one or more microservice container images. The generating of the one or more microservice container images by the one or more developer hardware units comprises at least one of: a continuous integration and continuous deployment (CI/CD) pipeline, build servers, and developer workstations. The metadata comprises at least one of: a cluster universally unique identifier (UUID), hardware addresses of the cluster of master nodes, updated version information of the one or more orchestration platforms, and a product name of the one or more orchestration platforms.

At the next step, the computer-implemented method includes creating, by the one or more developer hardware units through a hash data creation module, a pre-defined hash data based on at least one of: a registry location of the one or more microservice container images and an updated version of the one or more microservice container images.

At the next step, the computer-implemented method includes storing, by the one or more developer hardware units through a hardware security module, the created pre-defined hash data along with at least one of: the registry location of the one or more microservice container images and the updated version of the one or more microservice container images in one or more key management databases to analyze authenticity and integrity of the one or more orchestration platforms. Further, the computer-implemented method includes digitally signing, by the hardware security module, the pre-defined hash data with one or more container image signatures. The pre-defined hash data comprises cryptographic hash functions for ensuring tamper-evident tracking of the one or more microservice container images on the one or more orchestration platforms.

At the next step, the computer-implemented method includes executing, by one or more hardware processors through a microservice execution subsystem, the one or more microservice container images on a cluster of master nodes associated with the one or more orchestration platforms. Further, the computer-implemented method includes authenticating, by the microservice execution subsystem, the integrity of the one or more microservice container images prior to execution, by cross-referencing the one or more container image signatures with the pre-defined hash data stored in the one or more key management databases.

At the next step, the computer-implemented method includes obtaining, by the one or more hardware processors through a metadata-obtaining subsystem, the metadata associated with the one or more orchestration platforms at the time of execution of the one or more microservice container images.

At the next step, the computer-implemented method includes generating, by the one or more hardware processors through a hash generation subsystem, entitlement signature secret (ESS) data based on hash data of an associated orchestration platform of the one or more orchestration platforms by aggregating the received metadata. The ESS data is generated using a combination of at least one of: the cluster universally unique identifier (UUID), a set of MAC addresses associated with one or more master nodes of the one or more orchestration platforms, the updated version information of the one or more orchestration platforms, the product name of the one or more orchestration platform, a concatenated hash of Trusted Platform Module (TPM) identities of the cluster of master nodes, an external identity key integrated with a Key Management Service (KMS), and the external identity key stored in the one or more key management databases.

At the next step, the computer-implemented method includes performing, by the one or more hardware processors through a signature authentication subsystem, a comparative analysis between the generated ESS data and the pre-defined hash data, to authenticate the associated orchestration platform of the one or more orchestration platforms as one of: benign and malicious. Further, the computer-implemented method includes determining, by the signature authentication subsystem, the associated orchestration platform of the one or more orchestration platforms as malicious based on at least one of: a) an incompatibility of the generated ESS data with the pre-defined hash data, b) an absence of the one or more container image signatures in the generated ESS data, and c) a rejection of the authentication by the generated ESS data.

At the next step, the computer-implemented method includes providing, by the one or more hardware processors through an access control subsystem, one of: access control and deny control based on an outcome of the authentication as one of: the benign and the malicious, for the trustworthy access enforcement of the one or more microservice container images on the one or more orchestration platforms.

Further, the computer-implemented method includes inserting, by the one or more hardware processors through a hash insertion subsystem, the pre-defined hash data into the one or more orchestration platforms at an initial registration of the one or more orchestration platforms. The insertion of the pre-defined hash data into the one or more orchestration platforms allows the signature authentication subsystem to compare the generated ESS data and the pre-defined hash data at the time of execution of the one or more microservice container images.

In accordance with an embodiment of the present disclosure, a computer-implemented system for providing the trustworthy access enforcement to the one or more microservice container images on the one or more orchestration platforms is disclosed. The computer-implemented system comprises the one or more developer hardware units and one or more servers. The one or more developer hardware units are associated with one or more service providers. The one or more developer hardware units contain a set of programmable instructions in form of a plurality of modules to be executed by the one or more developer hardware units. The plurality of modules comprises a container image generation module, a hash data creation module, and a hardware security module.

In yet another embodiment, the container image generation module is configured to generate the one or more microservice container images along with the pre-defined hardcoded elements for identifying the metadata associated with the one or more orchestration platforms at the time of execution of the one or more microservice container images.

In yet another embodiment, the hash data creation module is configured to create the pre-defined hash data based on at least one of: the registry location of the one or more microservice container images and the updated version of the one or more microservice container images.

In yet another embodiment, the hardware security module is configured to store the created pre-defined hash data along with at least one of: the registry location of the one or more microservice container images and the updated version of the one or more microservice container images in the one or more key management databases for analyzing authenticity and integrity of the one or more orchestration platforms.

In yet another embodiment, the one or more servers comprise one or more hardware processors and a memory unit. The memory unit is operatively connected to the one or more hardware processors. The memory unit comprises a set of computer-readable instructions in form of a plurality of subsystems, configured to be executed by the one or more hardware processors. The plurality of subsystems comprises the microservice execution subsystem, the metadata-obtaining subsystem, the hash generation subsystem, the signature authentication subsystem, the access control subsystem, and the hash insertion subsystem.

In yet another embodiment, the microservice execution subsystem is configured to execute the one or more microservice container images on the cluster of master nodes associated with the one or more orchestration platforms.

In yet another embodiment, the metadata-obtaining subsystem is configured to obtain the metadata associated with the one or more orchestration platforms at the time of execution of the one or more microservice container images.

In yet another embodiment, the hash generation subsystem is configured to generate the ESS data based on the hash data of the associated orchestration platform of the one or more orchestration platforms by aggregating the received metadata.

In yet another embodiment, the signature authentication subsystem is configured to perform the comparative analysis between the generated ESS data and the pre-defined hash data, for authenticating the associated orchestration platform of the one or more orchestration platforms as one of the: benign and malicious.

In yet another embodiment, the access control subsystem is configured to provide one of the: access control and deny control based on the outcome of the authentication as one of: the benign and the malicious, for the trustworthy access enforcement of the one or more microservice container images on the one or more orchestration platforms.

In accordance with an embodiment of the present disclosure, a non-transitory computer-readable storage medium storing computer-executable instructions that, when executed by the one or more hardware processors, cause the one or more hardware processors to perform operations for providing the trustworthy access enforcement of the one or more microservice container images on the one or more orchestration platforms is disclosed.

The operations comprise: a) generating the one or more microservice container images along with pre-defined hard-coded elements to identify the metadata associated with the one or more orchestration platforms at the time of execution of the one or more microservice container images, b) creating the pre-defined hash data based on at least one of: the registry location of the one or more microservice container images and the updated version of the one or more microservice container images, c) storing the created pre-defined hash data along with at least one of: the registry location of the one or more microservice container images and the updated version of the one or more microservice container images in the one or more key management databases to analyze authenticity and integrity of the one or more orchestration platforms, d) executing the one or more microservice container images on the cluster of master nodes associated with the one or more orchestration platforms, e) obtaining the metadata associated with the one or more orchestration platforms at the time of execution of the one or more microservice container images, f) generating the ESS data based on the hash data of the associated orchestration platform of the one or more orchestration platforms by aggregating the received metadata, g) performing the comparative analysis between the generated ESS data and the pre-defined hash data, to authenticate the associated orchestration platform of the one or more orchestration platforms as one of the: benign and malicious, and h) providing one of the: access control and deny control based on the outcome of the authentication as one of: the benign and the malicious, for the trustworthy access enforcement of the one or more microservice container images on the one or more orchestration platforms To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which:

FIG. 3 illustrates an exemplary flow chart of a computer-implemented method for providing trustworthy access enforcement to the one or more microservice container images on one or more orchestration platforms, in accordance with an embodiment of the present disclosure.

Figure 1:
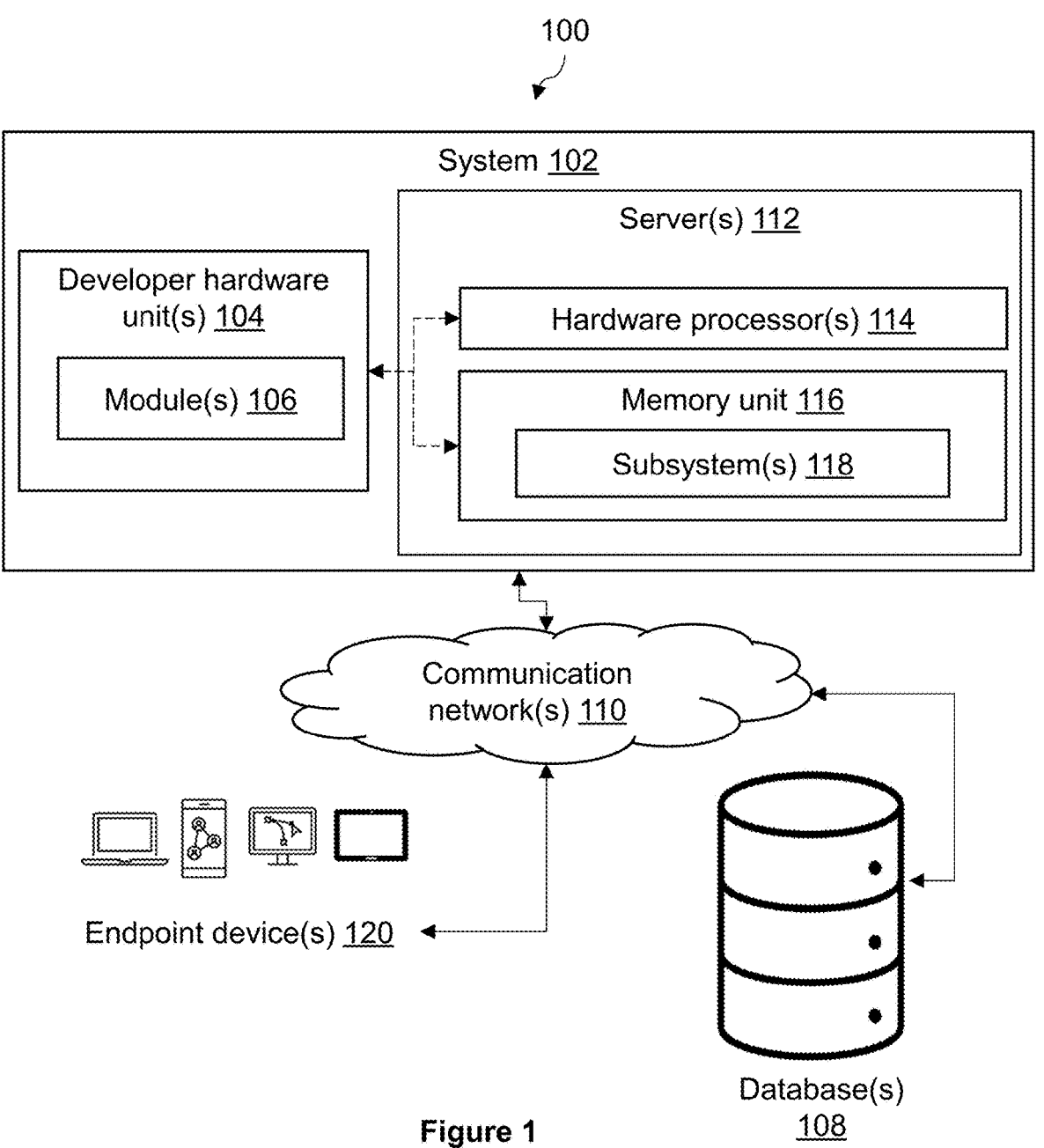
FIG. 1 illustrates an exemplary block diagram representation of a network architecture depicting a computer-implemented system for providing trustworthy access enforcement to one or more microservice container images on one or more orchestration platforms, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module include dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

Referring now to the drawings, and more particularly to FIG. 1 through FIG. 4, where similar reference characters denote corresponding features consistently throughout the figures, there are shown preferred embodiments, and these embodiments are described in the context of the following exemplary system and/or method.

FIG. 1 illustrates an exemplary block diagram representation of a network architecture 100 depicting a computer-implemented system 102 for providing trustworthy access enforcement to one or more microservice container images on one or more orchestration platforms, in accordance with an embodiment of the present disclosure.

According to an exemplary embodiment of the present disclosure, the network architecture 100 may include the computer-implemented system 102, one or more databases

108, and one or more endpoint devices 120. The computer-implemented system 102, the one or more databases 108, and the one or more endpoint devices 120 may be communicatively coupled via one or more communication networks 110, ensuring seamless data transmission, processing, and decision-making. The computer-implemented system 102 acts as the central processing unit within the network architecture 100, responsible for generating the one or more microservice container images, creating a pre-defined hash data, and performing a comparative analysis between a generated entitlement signature secret (ESS) data and the pre-defined hash data. The computer-implemented system 102 is configured to execute a set of computer-readable instructions that control a plurality of subsystems 118, providing the trustworthy access enforcement to the one or more microservice container images on the one or more orchestration platforms.

In an exemplary embodiment, the computer-implemented system 102 comprises one or more developer hardware units 104, and one or more servers 112. The one or more developer hardware units 104 are associated with one or more service providers. The one or more developer hardware units 104 contain a set of programable instructions in form of a plurality of modules 106 to be executed by the one or more developer hardware units 104. The plurality of modules 106 comprises a container image generation module, a hash data creation module, and a hardware security module. The one or more developer hardware units 104 comprises, but not limited to, at least one of: a continuous integration and continuous deployment (CI/CD) pipeline, build servers, developer workstations, and the like.

In an exemplary embodiment, the one or more servers 112 may comprise a combination of discrete components, an integrated circuit, an application-specific integrated circuit, a field-programmable gate array, a digital signal processor, or other suitable hardware. The "software" may comprise one or more objects, agents, threads, lines of code, subroutines, separate software applications, two or more lines of code, or other suitable software structures operating in one or more software applications or one or more hardware processors 114. The one or more servers 112 is operatively connected to each developer hardware unit 104 of the one or more developer hardware units 104. The one or more servers 112 comprises the one or more hardware processors 114 and a memory unit 116. The memory unit 116 is operatively connected to the one or more hardware processors 114. The memory unit 116 comprises a set of computer-readable instructions in the form of the plurality of subsystems 118, configured to be executed by the one or more hardware processors 114.

In an exemplary embodiment, the one or more hardware processors 114 may include, for example, microprocessors, microcomputers, microcontrollers, digital signal processors, central processing units, state machines, logic circuits, and/or any devices that manipulate data or signals based on operational instructions. Among other capabilities, the one or more hardware processors 114 may fetch and execute computer-readable instructions in the memory unit 116 operationally coupled with the computer-implemented system 102 for performing tasks such as data processing, input/output processing, and/or any other functions. Any reference to a task in the present disclosure may refer to an operation being or that may be performed on data. The one or more hardware processors 114 is high-performance processors capable of handling large volumes of data and complex computations. The one or more hardware processors 114 may be, but not limited to, at least one of:

multi-core central processing units (CPU), graphics processing units (GPUs), and specialized Artificial Intelligence (AI) accelerators that enhance an ability of the computer-implemented system 102 to process real-time data from one or more sources simultaneously.

In an exemplary embodiment, the one or more databases 108 may configured to store, and manage data related to various aspects of the computer-implemented system 102. The one or more databases 108 may store at least one of, but not limited to, pre-defined hash data, registry location data, container image versioning data, entitlement signature secret (ESS) data, metadata associated with the one or more orchestration platforms, key management data, access control and authentication records, and the like. The one or more databases 108 serve as a centralized repository for critical data elements that are integral to the secure operation of the computer-implemented system 102, enabling reliable access enforcement, container image integrity checks, and secure orchestration platform interactions. The one or more databases 108 enable the computer-implemented system 102 to dynamically retrieve, analyze, and update the stored data in real-time, for providing the trustworthy access enforcement to the one or more microservice container images on the one or more orchestration platforms. The one or more databases 108 may include different types of databases such as, but not limited to, relational databases (e.g., Structured Query Language (SQL) databases), non-Structured Query Language (NoSQL) databases (e.g., MongoDB, Cassandra), time-series databases (e.g., InfluxDB), an OpenSearch database, and object storage systems (e.g., Amazon S3, PostgresDB).

In an exemplary embodiment, the one or more endpoint devices 120 are configured to enable the one or more service providers and one or more end users to interact with the computer-implemented system 102 and the one or more orchestration platforms. The one or more endpoint devices 120 may be digital devices, computing devices, and/or networks. The one or more endpoint devices 120 may include, but not limited to, a mobile device, a smartphone, a personal digital assistant (PDA), a tablet computer, a phablet computer, a wearable computing device, a virtual reality/augmented reality (VR/AR) device, a laptop, a desktop, and the like.

In an exemplary embodiment, the one or more orchestration platforms are responsible for managing a cluster of resources (compute, storage, and network) in order to efficiently deploy, run, and maintain applications that are packaged as containers. The one or more orchestration platforms provide an environment where the one or more microservice container images are executed. The one or more orchestration platforms may comprise, but not limited to, at least one of: Kubernetes (K8s), Docker Swarm, OpenShift, Amazon's Elastic Container Service (ECS) and Elastic Kubernetes Service (EKS), and the like.

In an exemplary embodiment, the one or more endpoint devices 120 may be associated with, but not limited to, one or more service providers, one or more customers, an individual, an administrator, a vendor, a technician, a specialist, an instructor, a supervisor, a team, an entity, an organization, a company, a facility, a bot, any other user, and combination thereof. The entity, the organization, and the facility may include, but not limited to, an e-commerce company, online marketplaces, service providers, retail stores, a merchant organization, a logistics company, warehouses, transportation company, an airline company, a hotel booking company, a hospital, a healthcare facility, an exercise facility, a laboratory facility, a company, an outlet, a manufacturing unit, an enterprise, an organization, an educational institution, a secured facility, a warehouse facility, a supply chain facility, any other facility/organization and the like.

In an exemplary embodiment, the one or more communication networks 110 may be, but not limited to, a wired communication network and/or a wireless communication network, a local area network (LAN), a wide area network (WAN), a Wireless Local Area Network (WLAN), a metropolitan area network (MAN), a telephone network, such as the Public Switched Telephone Network (PSTN) or a cellular network, an intranet, the Internet, a fiber optic network, a satellite network, a cloud computing network, or a combination of networks. The wired communication network may comprise, but not limited to, at least one of: Ethernet connections, Fiber Optics, Power Line Communications (PLCs), Serial Communications, Coaxial Cables, Quantum Communication, Advanced Fiber Optics, Hybrid Networks, and the like. The wireless communication network may comprise, but not limited to, at least one of: wireless fidelity (wi-fi), cellular networks (including fourth generation (4G) technologies and fifth generation (5G) technologies), Bluetooth, ZigBee, long-range wide area network (LoRaWAN), satellite communication, radio frequency identification (RFID), 6G (sixth generation) networks, advanced IoT protocols, mesh networks, non-terrestrial networks (NTNs), near field communication (NFC), and the like.

In an exemplary embodiment, the computer-implemented system 102 may be implemented by way of a single device or a combination of multiple devices that may be operatively connected or networked together. The computer-implemented system 102 may be implemented in hardware or a suitable combination of hardware and software.

Though few components and the plurality of subsystems 118 are disclosed in FIG. 1, there may be additional components and subsystems which is not shown, such as, but not limited to, ports, routers, repeaters, firewall devices, network devices, the one or more databases 108, network attached storage devices, assets, machinery, instruments, facility equipment, emergency management devices, image capturing devices, any other devices, and combination thereof. The person skilled in the art should not be limiting the components/subsystems shown in FIG. 1. Although FIG. 1 illustrates the computer-implemented system 102, and the one or more endpoint devices 120 connected to the one or more databases 108, one skilled in the art can envision that the computer-implemented system 102, and the one or more endpoint devices 120 may be connected to several user devices located at various locations and several databases via the one or more communication networks 110.

Those of ordinary skilled in the art will appreciate that the hardware depicted in FIG. 1 may vary for particular implementations. For example, other peripheral devices such as an optical disk drive and the like, the local area network (LAN), the wide area network (WAN), wireless (e.g., wireless-fidelity (Wi-Fi)) adapter, graphics adapter, disk controller, input/output (I/O) adapter also may be used in addition or place of the hardware depicted. The depicted example is provided for explanation only and is not meant to imply architectural limitations concerning the present disclosure.

Those skilled in the art will recognize that, for simplicity and clarity, the full structure and operation of all data processing systems suitable for use with the present disclosure are not being depicted or described herein. Instead, only so much of the computer-implemented system 102 as is unique to the present disclosure or necessary for an understanding of the present disclosure is depicted and described. The remainder of the construction and operation of the computer-implemented system 102 may conform to any of the various current implementations and practices that were known in the art.

Figure 2A:
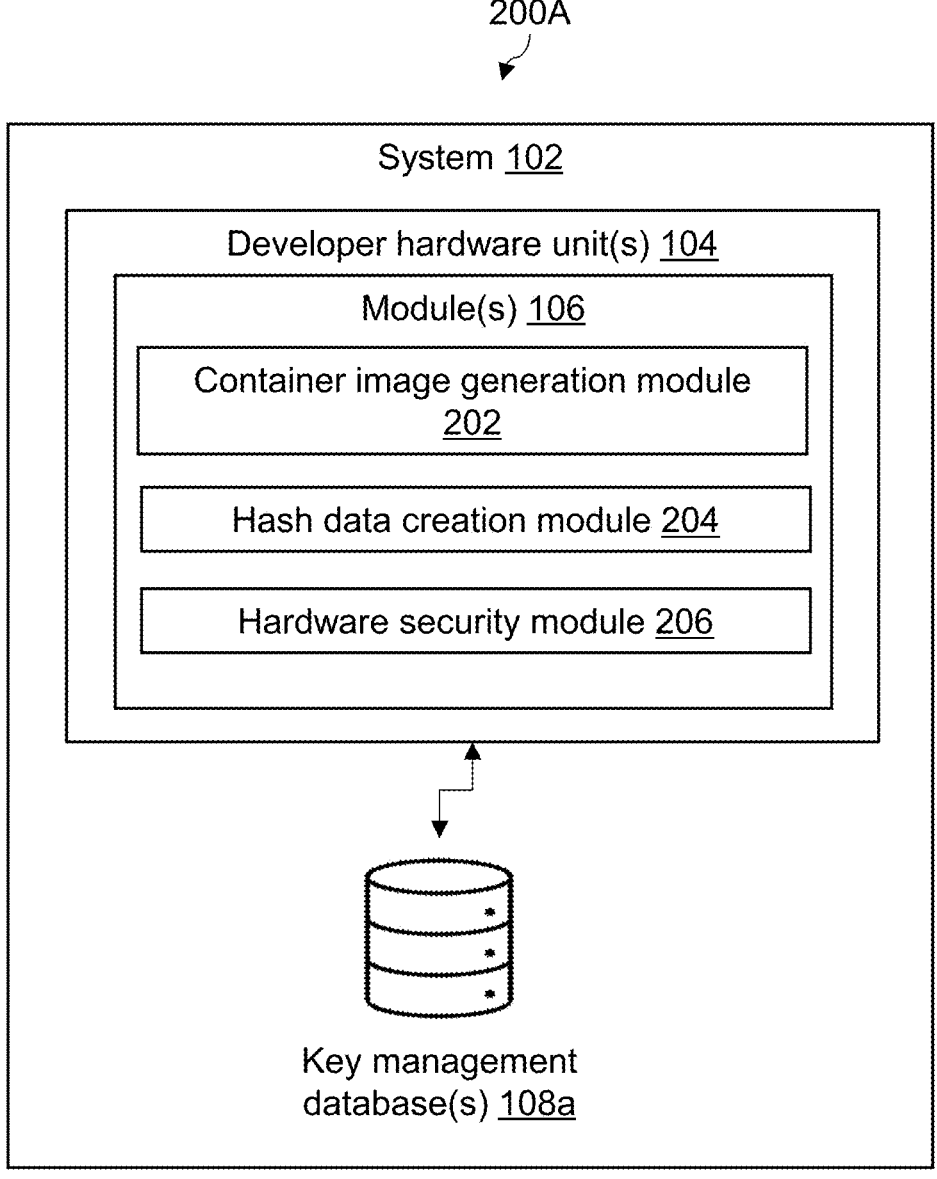
FIG. 2A illustrates an exemplary block diagram representation of one or more developer hardware units within the computer-implemented system as shown in FIG. 1 for providing trustworthy access enforcement to one or more microservice container images on one or more orchestration platforms, in accordance with an embodiment of the present disclosure.

FIG. 2A illustrates an exemplary block diagram representation 200A of one or more developer hardware units 104 within the computer-implemented system 102 as shown in FIG. 1 for providing trustworthy access enforcement to the one or more microservice container images on the one or more orchestration platforms, in accordance with an embodiment of the present disclosure.

Figure 2B:
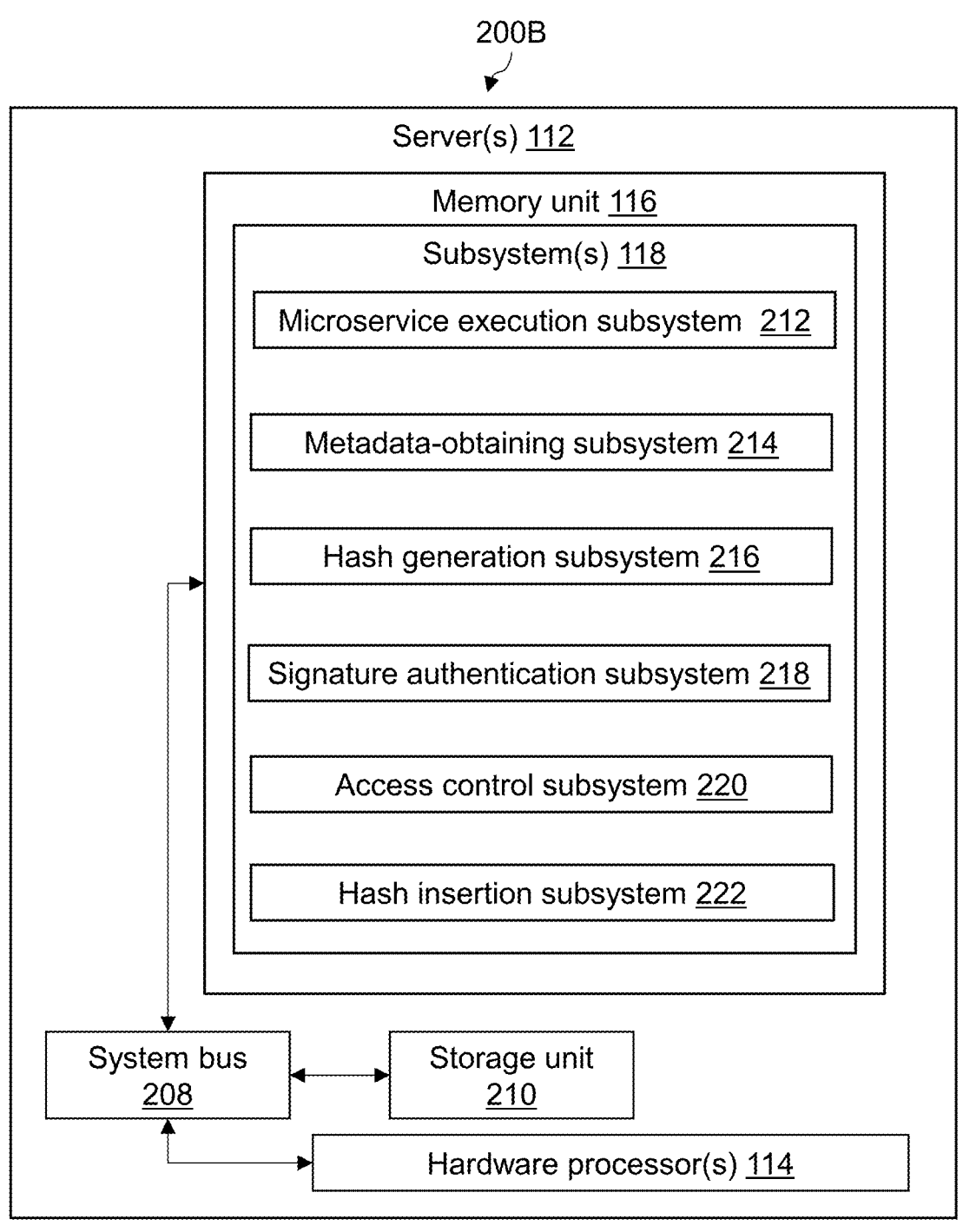
FIG. 2B illustrates an exemplary block diagram representation of one or more servers within the computer-implemented system as shown in FIG. 1 for providing trustworthy access enforcement to one or more microservice container images on one or more orchestration platforms, in accordance with an embodiment of the present disclosure.

FIG. 2B illustrates an exemplary block diagram 200B of the one or more servers 112 within the computer-implemented system 102 as shown in FIG. 1 for providing trustworthy access enforcement to the one or more microservice container images on the one or more orchestration platforms, in accordance with an embodiment of the present disclosure.

Figure 2C:
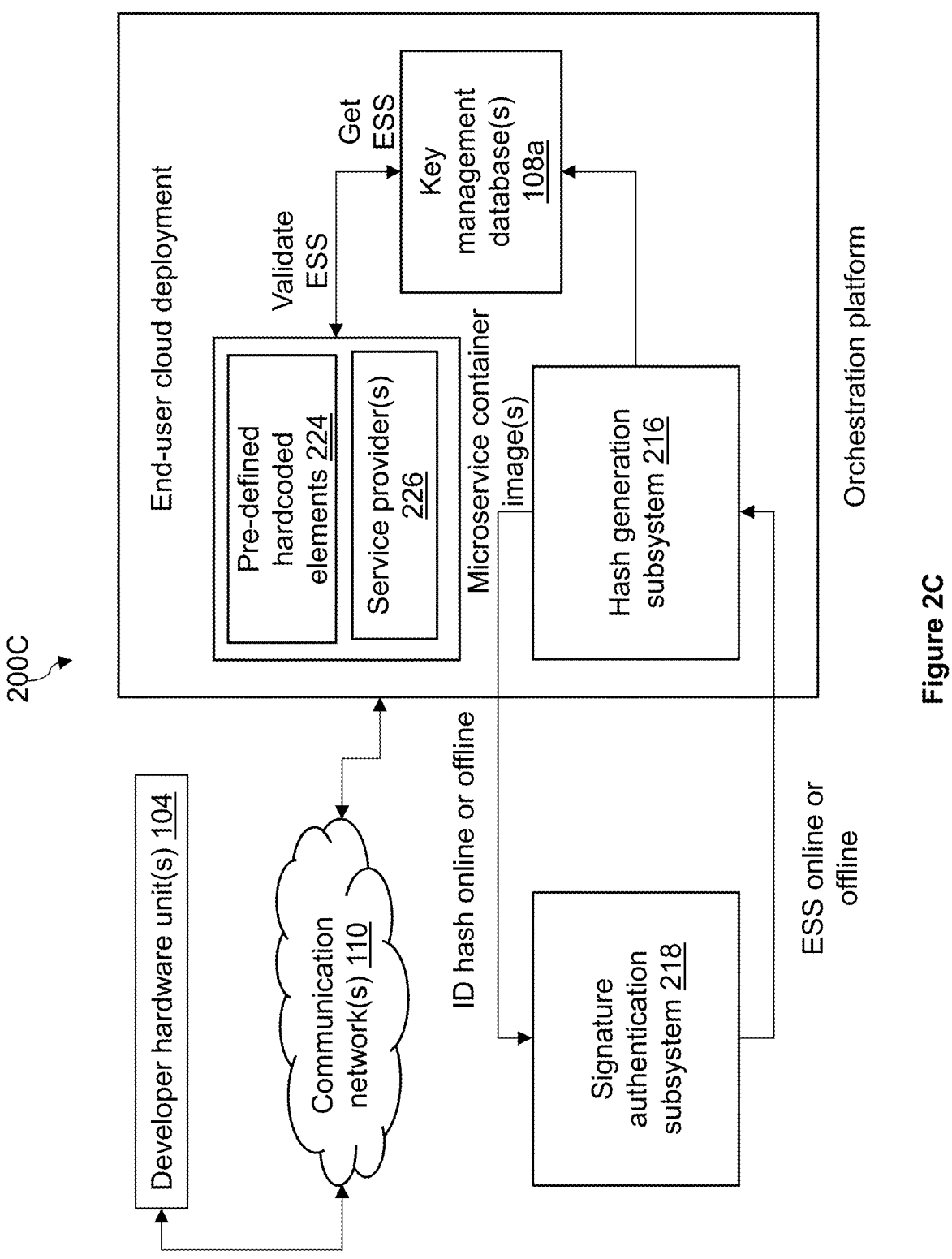
FIG. 2C illustrates an exemplary flow diagram of the computer-implemented system, in accordance with an embodiment of the present disclosure.

FIG. 2C illustrates an exemplary flow diagram 200C of the computer-implemented system 102, in accordance with an embodiment of the present disclosure.

Figure 2D:
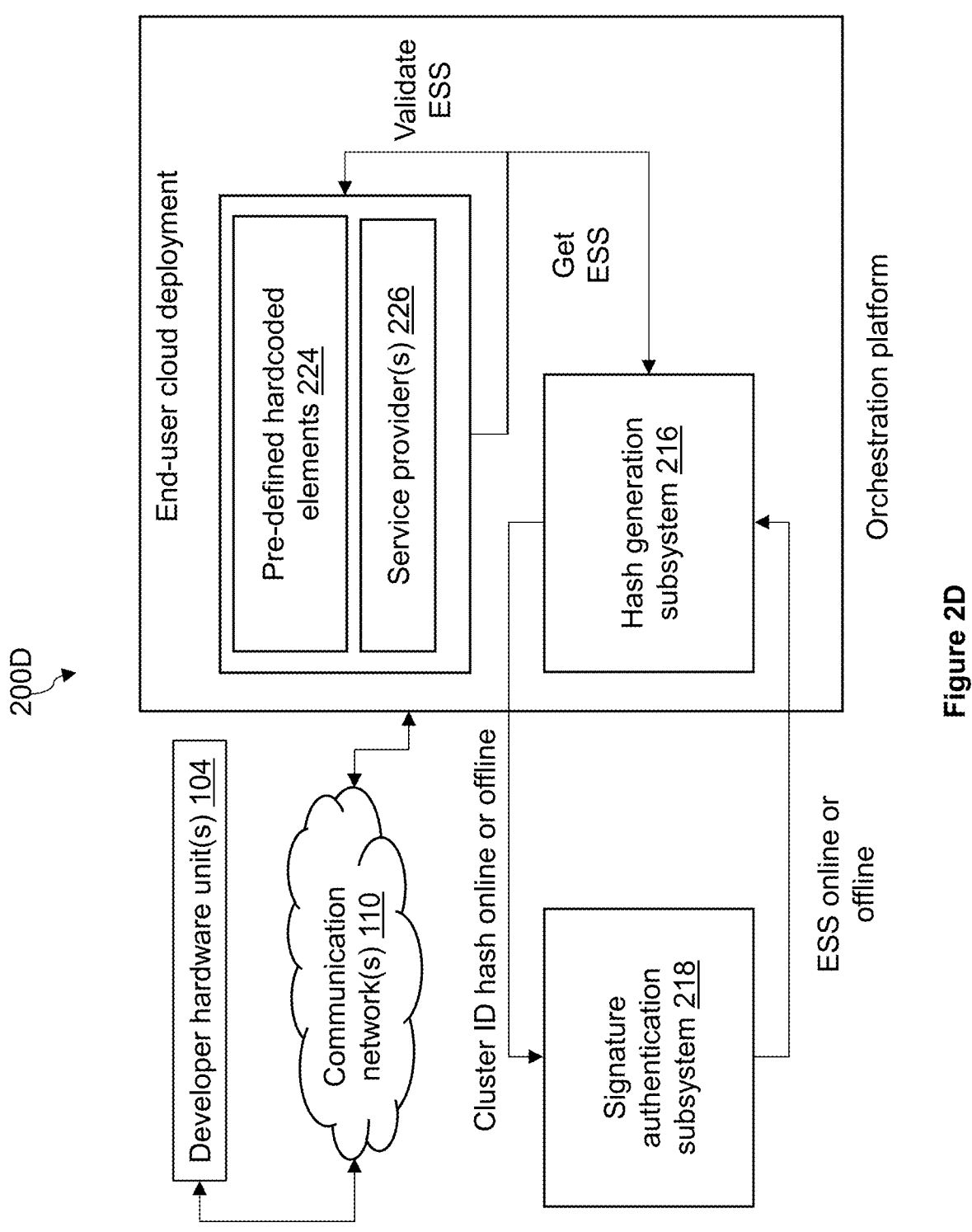
FIG. 2D illustrates an exemplary embodiment of an alternate flow diagram representation of the computer-implemented system as shown in FIG. 2C, in accordance with an embodiment of the present disclosure.

FIG. 2D illustrates an exemplary embodiment of an alternate flow diagram 200D representation of the computer-implemented system 102 as shown in FIG. 2C, in accordance with an embodiment of the present disclosure.

In an exemplary embodiment, the computer-implemented system 102 (hereinafter referred to as the system 102) comprises the one or more developer hardware units 104 and the one or more servers 112. The one or more developer hardware units 104 are associated with one or more service providers 226 who are responsible for developing, building, and preparing container images for deployment within a microservice orchestration environment. The one or more developer hardware units 104 contain the set of programable instructions in the form of the plurality of modules 106, which are executed by the one or more developer hardware units 104 to carry out various tasks necessary for secure creation and validation of the one or more microservice container images. The plurality of modules 106 comprises a container image generation module 202, a hash data creation module 204, and a hardware security module 206.

In an exemplary embodiment, the one or more developer hardware units 104 comprise, but not limited to, at least one of: a continuous integration and continuous deployment (CI/CD) pipeline, build servers, developer workstations, and the like. The CI/CD pipeline facilitates automated build and deployment processes, ensuring that the one or more microservice container images are continuously integrated, tested, and deployed securely and efficiently. The CI/CD pipeline automates the interaction between the container image generation module 202, the hash data creation module 204, and the hardware security module 206, ensuring that security measures such as cryptographic signing are seamlessly incorporated into the one or more microservice container images creation process.

The build servers act as dedicated machines for compiling and assembling the components of the one or more microservice container images. The build servers execute the programmable instructions provided by the one or more developer hardware units 104, and they ensure that the one or more microservice container images generation and security functions are carried out in a controlled and consistent environment.

The developer workstations are individual machines used by the one or more service providers 226 to write and test the set of programable instructions before it is packaged into the one or more microservice container images. The plurality of modules 106 within the developer workstations works in conjunction with the CI/CD pipeline and build servers, ensuring that the security measures (e.g., hash creation and cryptographic signing) are applied early in the development process.

In an exemplary embodiment, the container image generation module 202 is configured to generate the one or more microservice container images. The container image generation module 202 is configured to not only package am application code and its dependencies into the one or more microservice container images but also to embed pre-defined hardcoded elements 224 that facilitate identification and authentication of the metadata associated with the one or more orchestration platforms on which the one or more microservice container images may eventually be executed. The container image generation module 202 operates systematically to ensure that the resulting the one or more microservice container images are secure, verifiable, and compliant with licensing and security requirements.

The container image generation module 202 is responsible for generating the one or more microservice container images. Each microservice container image of the one or more microservice container images is self-contained, meaning it includes the necessary software, libraries, configuration files, and dependencies required to run the microservice on the one or more orchestration platforms. As part of creation of the one or more microservice container images, the container image generation module 202 incorporates the pre-defined hardcoded elements 224 directly into the one or more microservice container images. The pre-defined hardcoded elements 224 are unique identifiers or cryptographic signatures that are essential for verifying the execution environment. The pre-defined hardcoded elements 224 are the hardcoded trust chains may include platform-specific identifiers and security tokens. At the time of execution of the one or more microservice container images, an associated orchestration platform (e.g., Kubernetes, Docker Swarm) of the one or more orchestration platforms may communicate its metadata to the one or more microservice container images for validation purposes. The container image generation module 202 ensures that the pre-defined hardcoded elements 224 embedded in the one or more microservice container images are capable of: a) reading and identifying the metadata from the orchestration platform at runtime, and b) comparing the received metadata with the pre-defined hardcoded elements 224 within the one or more microservice container images to ensure the associated orchestration platform is authorized and legitimate. The pre-defined hardcoded elements 224 avert at least one of: unauthorized copying, replication, and deployment of the one or more microservice container images on non-approved orchestration platforms.

In an exemplary embodiment, the hash data creation module 204 is configured to create the pre-defined hash data that tracks and verifies the integrity and authenticity of the one or more microservice container images throughout their lifecycle. The pre-defined hash data serves as a critical mechanism for ensuring that any modifications, unauthorized deployments, or tampering attempts are detectable, thereby providing a robust security layer for the one or more microservice container images. The pre-defined hash data is generated based on at least one of: the registry location of the one or more microservice container images and the updated version of the one or more microservice container images. The registry location includes details about a container registry where the one or more microservice container images are stored, such as a Uniform Resource Identifier (URI) or other location-based identifiers. Each time an updated version of the one or more microservice container images are generated, updated, or modified (e.g., due to new features, patches, or security updates), the hash data creation module 204 calculates a new hash value representing the updated one or more microservice container images. The combination of these inputs results in the creation of the pre-defined hash data that is unique to a specific container image and version.

In an exemplary embodiment, the hardware security module 206 is configured to store the created pre-defined hash data along with at least one of: the registry location of the one or more microservice container images and the updated version of the one or more microservice container images in the one or more key management databases 108a for analyzing authenticity and integrity of the one or more orchestration platforms. The pre-defined hash data is digitally signed with one or more container image signatures by the hardware security module 206. The pre-defined hash data comprises cryptographic hash functions, ensuring tamper-evident tracking of the one or more microservice container images on the one or more orchestration platforms. The hardware security module 206 provides a secure environment for cryptographic operations, ensuring that the signing process is tamper-resistant and protected from unauthorized access. The digital signature is created using a private key stored in the one or more key management databases 108a, which is part of a public-private key pair. The corresponding public key may later be used by the associated orchestration platforms or other end users to verify the validity of the signature and, consequently, the authenticity of the of the one or more microservice container images.

In an exemplary embodiment, the system 102 comprises the one or more servers 112, the memory unit 116, and a storage unit 210. The one or more hardware processors 114, the memory unit 116, and the storage unit 210 are communicatively coupled through a system bus 208 or any similar mechanism. The system bus 208 functions as the central conduit for data transfer and communication between the one or more hardware processors 114, the memory unit 116, and the storage unit 210. The system bus 208 facilitates the efficient exchange of information and instructions, enabling the coordinated operation of the system 102. The system bus 208 may be implemented using various technologies, including but not limited to, parallel buses, serial buses, or high-speed data transfer interfaces such as, but not limited to, at least one of a: universal serial bus (USB), peripheral component interconnect express (PCIe), and similar standards.

In an exemplary embodiment, the memory unit 116 is operatively connected to the one or more hardware processors 114. The memory unit 116 comprises the plurality of subsystems 118 in the form of programmable instructions executable by the one or more hardware processors 114. The plurality of subsystems 118 comprises a microservice execution subsystem 212, a metadata-obtaining subsystem 214, a hash generation subsystem 216, a signature authentication subsystem 218, an access control subsystem 220, and a hash insertion subsystem 222. The one or more hardware processors 114 associated within the one or more servers 112, as used herein, means any type of computational circuit, such as, but not limited to, the microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 114 may also include embedded controllers, such as generic or programmable logic devices or arrays, application-specific integrated circuits, single-chip computers, and the like.

The memory unit 116 may be the non-transitory volatile memory and the non-volatile memory. The memory unit 116 may be coupled to communicate with the one or more hardware processors 114, such as being a computer-readable storage medium. The one or more hardware processors 114 may execute machine-readable instructions and/or source code stored in the memory unit 116. A variety of machine-readable instructions may be stored in and accessed from the memory unit 116. The memory unit 116 may include any suitable elements for storing data and machine-readable instructions, such as read-only memory, random access memory, erasable programmable read-only memory, electrically erasable programmable read-only memory, a hard drive, a removable media drive for handling compact disks, digital video disks, diskettes, magnetic tape cartridges, memory cards, and the like. In the present embodiment, the memory unit 116 includes the plurality of subsystems 118 stored in the form of machine-readable instructions on any of the above-mentioned storage media and may be in communication with and executed by the one or more hardware processors 114.

The storage unit 210 may be a cloud storage or the one or more databases 108 such as those shown in FIG. 1. The storage unit 210 may store, but not limited to, recommended course of action sequences dynamically generated by the system 102. These action sequences are generated based on real-time data inputs and analysis of the one or more microservice container images, one or more orchestration platform states, and security configurations. Additionally, the storage unit 210 may retain previous action sequences for comparison and future reference, enabling continuous refinement of the system 102 over time. The storage unit 210 may be any kind of database such as, but not limited to, relational databases, dedicated databases, dynamic databases, monetized databases, scalable databases, cloud databases, distributed databases, any other databases, and a combination thereof.

In an exemplary embodiment, the microservice execution subsystem 212 is configured to execute/deploy the one or more microservice container images on a cluster of master nodes. A cluster typically consists of a group of interconnected computing nodes, where master nodes oversee orchestration tasks such as container scheduling, resource allocation, and management. The one or more orchestration platforms are the frameworks or systems, such as the Kubernetes, the Docker Swarm, or the Apache Mesos, that handle the orchestration of containerized microservices across the cluster of master nodes. The microservice execution subsystem 212 ensures that the one or more microservice container images are launched and executed across the cluster of master nodes in a coordinated manner, allowing the overall application to function seamlessly in a distributed environment.

Before the execution of any container image with in the one or more microservice container images, the microservice execution subsystem 212 is configured to perform a critical security check i.e., authenticating the integrity of the one or more microservice container images. This authentication process involves verifying that the container images have not been tampered with and that they maintain the original integrity as intended by the service provider. The microservice execution subsystem 212 performs this authentication by cross-referencing the digital signatures of the container images with the pre-defined hash data. The pre-defined hash data is securely stored in the one or more key management database 108*a*, which is a specialized database for managing cryptographic keys, hashes, and signatures. The pre-defined hash data serves as a tamper-proof record of the one or more microservice container images content and origin. When the one or more microservice container images are about to be executed, its associated cryptographic signature is checked against this pre-defined hash data to confirm that the one or more microservice container images is authentic and has not been altered. This step is crucial in preventing unauthorized or compromised one or more microservice container images from being deployed on the associated orchestration platform.

In an exemplary embodiment, the metadata-obtaining subsystem 214 is configured to obtain the metadata associated with the one or more orchestration platforms at the time of execution of the one or more microservice container images. In an exemplary embodiment, the metadata comprises, but not limited to, at least one of: a cluster universally unique identifier (UUID), hardware addresses of the cluster of master nodes, updated version information of the one or more orchestration platforms, and a product name of the one or more orchestration platform.

In specific, each cluster of master node within the cluster of master nodes has a unique identifier, known as a Cluster UUID, which helps the system 102 identify the specific cluster within which the one or more microservice container images are being executed. This ensures that the microservice execution subsystem 212 knows the exact location and environment where the deployment is occurring. The hardware addresses (e.g., MAC addresses or other network identifiers) of the cluster of master nodes within the cluster are recorded as part of the metadata. The hardware addresses ensure that the microservice container images are executed on the correct nodes, adding an additional layer of security by tying the execution to specific physical hardware. The updated version of the one or more orchestration platforms is a critical piece of metadata stored for each deployment. This updated version information ensures compatibility between the one or more microservice container images and the associated orchestration platform, preventing any potential issues caused by the updated version mismatches or outdated orchestration environments. The system 102 ensures that microservice containers are executed on up-to-date, compatible one or more orchestration platforms to optimize performance and maintain security compliance. The product name of the one or more orchestration platforms (e.g., Kubernetes, Docker, OpenShift) is also included as part of the metadata. This ensures that the microservice execution subsystem 212 is aware of the specific platform in use, allowing for any platform-specific configurations or optimizations to be applied during execution. Knowing the exact orchestration platform helps the microservice execution subsystem 212 tailor its execution strategy according to the unique features and capabilities of the associated orchestration platform.

In an exemplary embodiment, the hash generation subsystem 216 is configured to generate the entitlement signature secret (ESS) data based on hash data of an associated orchestration platform of the one or more orchestration platforms by aggregating the received metadata. The hash generation process relies on cryptographic hash functions, such as, but not limited to, Secure Hash Algorithm 256-bit (SHA-256) or Secure Hash Algorithm 512-bit (SHA-512), which are configured to produce a fixed-size output (the hash value) from input data of any size. The cryptographic hash functions are collision-resistant, meaning it is practically impossible for two different sets of input data to produce the same hash value, further ensuring the uniqueness and integrity of the hash.

The hash generation subsystem 216 is configured to generate the ESS data using a combination of at least one of: the cluster UUID, a set of MAC addresses associated with one or more master nodes of the one or more orchestration platforms, the updated version information of the one or more orchestration platforms, the product name of the one or more orchestration platform, a concatenated hash of Trusted Platform Module (TPM) identities of the cluster of master nodes, an external identity key integrated with a Key Management Service (KMS), and the external identity key stored in the one or more key management databases 108*a*.

The Trusted Platform Module (TPM) is a hardware-based security mechanism that provides secure cryptographic functions. The TPM identities of the cluster of master nodes in the cluster are concatenated into a hash and included in the ESS data. This ensures that the ESS data is bound to a trusted hardware environment, providing strong attestation that the one or more orchestration platforms are secure and has not been tampered with. The external identity key is a cryptographic key managed by KMS. The integration of this key with the ESS data provides an additional layer of security, ensuring that the execution of the one or more microservice container images is tied to a trusted and managed identity. The KMS adds an extra dimension of security by handling key lifecycle management, such as rotation and revocation, further enhancing the robustness of the ESS data. The external identity key is securely stored in the one or more key management databases 108*a*. The one or more key management databases 108*a* is responsible for storing and managing sensitive cryptographic keys and associated metadata. By referencing this external key during ESS data generation, the system 102 ensures that the microservice execution is closely tied to a securely managed cryptographic identity, providing strong attestation and preventing unauthorized access to the one or more orchestration platforms.

In an exemplary embodiment, the signature authentication subsystem 218 is configured to perform a comparative analysis between the generated ESS data and the pre-defined hash data. The signature authentication subsystem 218 initiates a process where it compares the ESS data, which is dynamically generated at the time of execution based on the current state of the associated with the orchestration platform, with the pre-defined hash data that is created earlier during the one or more microservice container images generation and signing process. This comparative analysis is used to authenticate the associated orchestration platform of the one or more orchestration platforms as one of: benign (trusted and authorized) and malicious (untrusted or compromised). The signature authentication subsystem 218 ensures that the one or more microservice container images are executed in a secure and trusted orchestration platform, reducing the risk of unauthorized access, tampering, or execution in unapproved orchestration platforms.

The signature authentication subsystem 218 further configured to determine the associated orchestration platform of the one or more orchestration platforms as the benign based on a successful verification of the generated ESS data against the pre-defined hash data. When the generated ESS data matches the pre-defined hash data, it indicates that the associated orchestration platform's configuration, hardware information, and other relevant metadata are consistent with the expected, authorized associated orchestration platform.

This compatibility confirms that the associated orchestration platform has not been tampered with and is operating under secure, approved conditions. If the ESS data contains valid one or more container image signatures, it confirms that the one or more microservice container images being executed on the associated orchestration platform have been properly signed by the trusted service providers. This ensures that the one or more microservice container images are authentic and authorized for use, mitigating the risk of unauthorized or compromised container images being deployed. If the generated ESS data successfully passes the authentication process without any rejection or discrepancies, the associated orchestration platform is classified as benign. This indicates that the associated orchestration platform has valid cryptographic keys, correct metadata (such as cluster UUIDs and MAC addresses), and is operating with the expected version of the orchestration platform.

The signature authentication subsystem 218 further configured to determine the associated orchestration platform of the one or more orchestration platforms as malicious based on at least one of: a) an incompatibility of the generated ESS data with the pre-defined hash data, b) an absence of the one or more container image signatures in the generated ESS data, and c) a rejection of the authentication by the generated ESS data. If the ESS data generated at runtime does not match the pre-defined hash data, it indicates that the associated orchestration platform's environment or configuration has been altered or compromised. This mismatch suggests that the associated orchestration platform is untrusted, potentially due to tampering or an unauthorized configuration, leading to its classification as malicious. The absence of valid one or more container images signatures in the generated ESS data indicates that the one or more microservice container images have not been properly signed or validated. Without these one or more container images signatures, the associated orchestration platform cannot be trusted to execute the one or more container images signatures securely. The lack of one or more container images signatures are a strong indication of a security breach, such as a replay attack, where unauthorized copies of the one or more microservice container images are used without proper validation. Further, if the generated ESS data explicitly rejects the authentication process due to a failure in validating the metadata or cryptographic keys, the system 102 determines that the one or more orchestration platforms are malicious. This may be due to several reasons, including altered metadata, compromised cryptographic keys, or a mismatch in the platform's configuration compared to the expected setup.

In an exemplary embodiment, the access control subsystem 220 is configured to enforce access permissions for the one or more microservice container images on the one or more orchestration platforms based on the outcome of the authentication process. Specifically, the access control subsystem 220 provides one of: access control and deny control, depending on whether the associated orchestration platform is identified as benign or malicious by the signature authentication subsystem 218. When the associated orchestration platform is determined to be benign, the access control subsystem 220 grants permission to deploy and execute the one or more microservice container images. This decision ensures that the one or more microservice container images are run only on secure, trusted one or more orchestration platforms. The system 102 verifies that the benign one or more orchestration platforms adheres to security policies, cryptographic integrity, and licensing agreements. Upon successful authentication, the access control subsystem 220 authorizes access to the necessary resources for executing the container images, enforcing strict security protocols during the execution process.

In cases where the associated orchestration platform is classified as malicious, the access control subsystem 220 denies access to the container images, preventing unauthorized or compromised platforms from deploying or executing the one or more microservice container images. The deny control is enforced if discrepancies are found during the authentication process, such as incompatibility of the ESS data with the pre-defined hash data, missing valid signatures, or failed authentication. This protects the one or more microservice container images from being exposed to potentially hostile environments, thereby reducing the risk of tampering, unauthorized use, or exploitation.

In an exemplary embodiment, the hash insertion subsystem 222 is configured to insert the pre-defined hash data into the one or more orchestration platforms at an initial registration of the one or more orchestration platforms with the system 102. By embedding the pre-defined hash data at the time of registration, the system 102 establishes a baseline for future security checks. The pre-defined hash data may represent key identifiers, configurations, or other metadata associated with the associated orchestration platform, such as its registry location, version information, or unique hardware identifiers. The insertion of the pre-defined hash data into the one or more orchestration platforms is configured to allow the signature authentication subsystem to compare the generated ESS data and the pre-defined hash data at the time of execution of the one or more microservice container images. At the time of execution of the one or more microservice container images, the pre-defined hash data insertion allows for seamless comparison between the generated ESS data and the pre-defined hash data. This comparison is crucial for validating the authenticity of the orchestration platform and determining whether it is benign or malicious. If the ESS data matches the pre-defined hash data, the platform is deemed secure and authorized to run the container images. If discrepancies are detected, the one or more orchestration platforms may be classified as malicious, and access may be denied.

In an exemplary embodiment, as depicted in FIG. 2C, the one or more service providers 226 generates an ID Hash (representing metadata), and sends it to the one or more end users orchestration platform. The ESS data is based on this ID Hash and is generated either online or offline by the one or more service providers 226. The ESS data is then passed to the associated orchestration platform. The signature authentication subsystem 218 retrieves this ESS from the one or more key management databases 108a and validates the received ESS data, comparing it against the ID Hash to verify the authenticity of the one or more microservice container images.

In an exemplary embodiment, as depicted in FIG. 2D, the system 102 deploy the one or more microservice container images on the one or more orchestration platforms based on s cluster-based attestation. The one or more service providers 226 generate the cluster ID Hash, which represents specific metadata about the associated orchestration platform, such as the cluster UUID, the MAC addresses, and the TPM identities. The ESS is generated based on the aggregation of the metadata. The associated orchestration platform's attestation & entitlement bootstrap service i.e, the signature authentication subsystem 218 retrieves the ESS and verifies it using cluster-specific information stored in the one or more key management databases 108a. The pre-defined hardcoded elements 224 then validates the ESS data by comparing it with the Cluster ID Hash, verifying the associated orchestration platform's authenticity.

FIG. 3 illustrates an exemplary flow chart of a computer-implemented method 300 for providing trustworthy access enforcement to the one or more microservice container images on one or more orchestration platforms, in accordance with an embodiment of the present disclosure.

According to another exemplary embodiment of the present disclosure, the computer-implemented method 300 is disclosed. At step 302, the computer-implemented method 300 includes generating, by the one or more developer hardware units through the container image generation module, the one or more microservice container images. The one or more microservice container images are generated along with the pre-defined hardcoded elements to identify the metadata associated with the one or more orchestration platforms at a time of execution of the one or more microservice container images. The one or more microservice container images generated by the one or more developer hardware units comprises at least one of: the continuous integration and continuous deployment (CI/CD) pipeline, the build servers, and the developer workstations. The metadata comprises at least one of: the cluster universally unique identifier (UUID), the hardware addresses of the cluster of master nodes, the updated version information of the one or more orchestration platforms, and the product name of the one or more orchestration platforms.

At step 304, the computer-implemented method 300 includes creating, by the one or more developer hardware units through the hash data creation module, a pre-defined hash data. The pre-defined hash data is created based on at least one of: the registry location of the one or more microservice container images and the updated version of the one or more microservice container images.

At step 306, the computer-implemented method 300 includes storing, by the one or more developer hardware units through the hardware security module, the created pre-defined hash data along with at least one of: the registry location of the one or more microservice container images and the updated version of the one or more microservice container images in one or more key management databases. The stored pre-defined hash data is configured to analyze authenticity and integrity of the one or more orchestration platforms. Further, the computer-implemented method 300 includes digitally signing, by the hardware security module, the pre-defined hash data with the one or more container image signatures. The pre-defined hash data comprises cryptographic hash functions for ensuring tamper-evident tracking of the one or more microservice container images on the one or more orchestration platforms.

At step 308, the computer-implemented method 300 includes executing, by one or more hardware processors through the microservice execution subsystem, the one or more microservice container images on the cluster of master nodes associated with the one or more orchestration platforms. Further, the computer-implemented method 300 includes authenticating, by the microservice execution subsystem, the integrity of the one or more microservice container images prior to execution, by cross-referencing the one or more container image signatures with the pre-defined hash data stored in the one or more key management databases.

At step 310, the computer-implemented method 300 includes obtaining, by the one or more hardware processors through the metadata-obtaining subsystem, the metadata associated with the one or more orchestration platforms at the time of execution of the one or more microservice container images. The metadata assist the system identify the specific cluster within which the one or more microservice container images are being executed.

At step 312, the computer-implemented method 300 includes generating, by the one or more hardware processors through the hash generation subsystem, the ESS data based on the hash data of the associated orchestration platform of the one or more orchestration platforms by aggregating the received metadata. The ESS data is generated using a combination of at least one of: the cluster UUID, the set of MAC addresses associated with one or more master nodes of the one or more orchestration platforms, the updated version information of the one or more orchestration platforms, the product name of the one or more orchestration platform, the concatenated hash of TPM identities of the cluster of master nodes, the external identity key integrated with the KMS, and the external identity key stored in the one or more key management databases.

At step 314, the computer-implemented method 300 includes performing, by the one or more hardware processors through the signature authentication subsystem, the comparative analysis between the generated ESS data and the pre-defined hash data. The comparative analysis is configured to authenticate the associated orchestration platform of the one or more orchestration platforms as one of: benign and malicious. Further, the computer-implemented method 300 includes determining, by the signature authentication subsystem, the associated orchestration platform of the one or more orchestration platforms as malicious based on at least one of: a) an incompatibility of the generated ESS data with the pre-defined hash data, b) an absence of the one or more container image signatures in the generated ESS data, and c) a rejection of the authentication by the generated ESS data.

At step 316, the computer-implemented method 300 includes providing, by the one or more hardware processors through the access control subsystem, one of: access control and deny control. One of the access control and the deny control based on an outcome of the authentication as one of: the benign and the malicious, for the trustworthy access enforcement of the one or more microservice container images on the one or more orchestration platforms. Furthermore, the computer-implemented method 300 includes inserting, by the one or more hardware processors through the hash insertion subsystem, the pre-defined hash data into the one or more orchestration platforms at an initial registration of the one or more orchestration platforms. The insertion of the pre-defined hash data into the one or more orchestration platforms allows the signature authentication subsystem to compare the generated ESS data and the pre-defined hash data at the time of execution of the one or more microservice container images.

Figure 4:
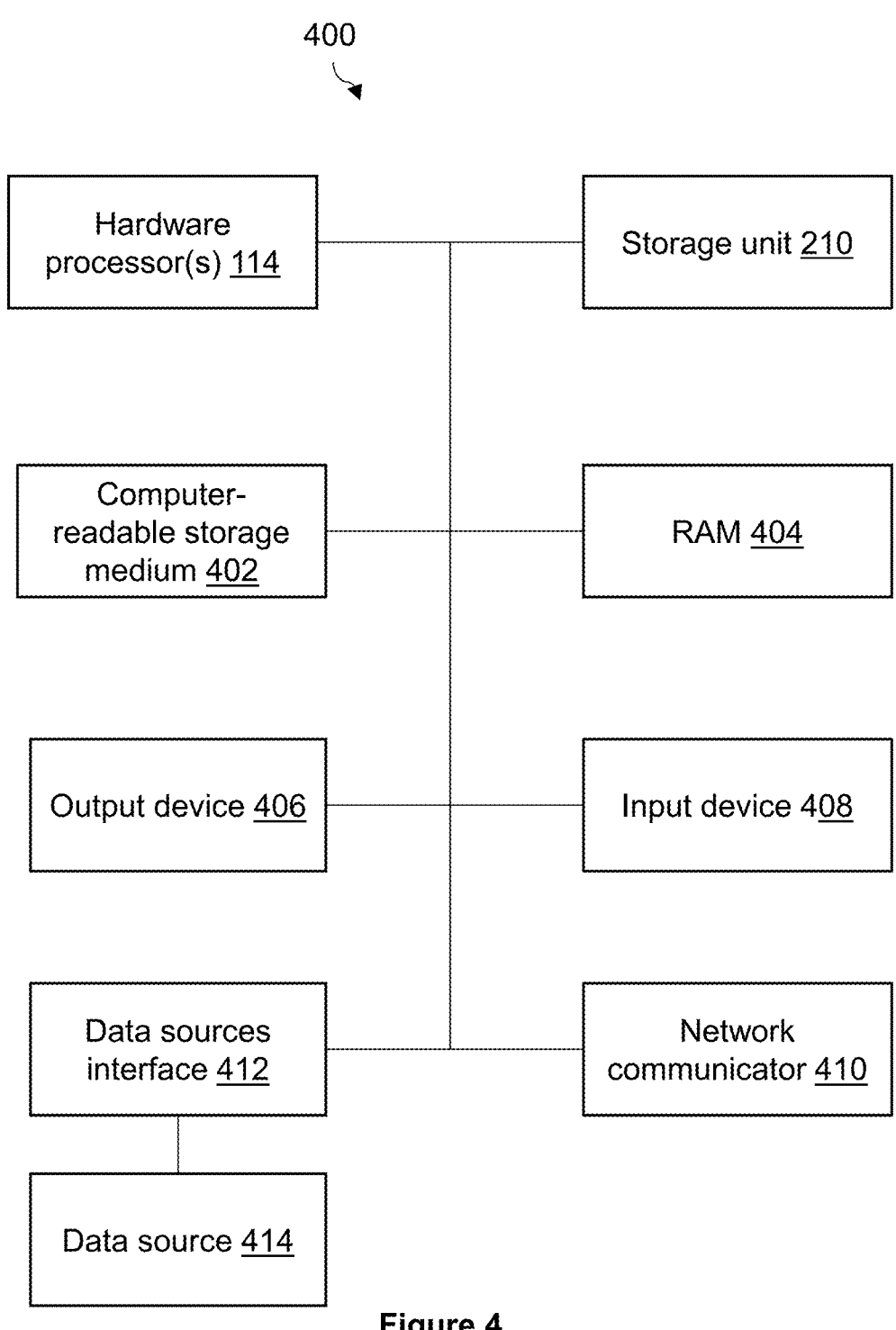
FIG. 4 illustrates an exemplary block diagram representation of a server platform for implementation of the disclosed computer-implemented system, in accordance with an embodiment of the present disclosure.

FIG. 4 illustrates an exemplary block diagram representation of a server platform 400 for implementation of the disclosed computer-implemented system 102, in accordance with an embodiment of the present disclosure.

In an exemplary embodiment, for the sake of brevity, the construction, and operational features of the system 102 which are explained in detail above are not explained in detail herein. Particularly, computing machines such as but not limited to internal/external server clusters, quantum computers, desktops, laptops, smartphones, tablets, and wearables may be used to execute the system 102 or may include the structure of the server platform 400. As illustrated, the server platform 400 may include additional components not shown, and some of the components described may be removed and/or modified. For example, a computer system with the multiple graphics processing units (GPUs) may be located on at least one of: internal printed circuit boards (PCBs) and external-cloud platforms including Amazon Web Services (AWS), Google Cloud Platform (GCP) Microsoft Azure (Azure), internal corporate cloud computing clusters, or organizational computing resources.

The server platform 400 may be a computer system such as the system 102 that may be used with the embodiments described herein. The computer system may represent a computational platform that includes components that may be in the one or more servers 112 or another computer system. The computer system may be executed by the one or more hardware processors 114 (e.g., single, or multiple processors) or other hardware processing circuits, the methods, functions, and other processes described herein. These methods, functions, and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system may include the one or more hardware processors 114 that execute software instructions or code stored on a non-transitory computer-readable storage medium 402 to perform methods of the present disclosure. The software code includes, for example, instructions to gather data and analyze the network environment data. For example, the plurality of subsystems 118 includes the microservice execution subsystem 212, the metadata-obtaining subsystem 214, the hash generation subsystem 216, the signature authentication subsystem 218, the access control subsystem 220, and the hash insertion subsystem 222.

The instructions on the computer-readable storage medium 402 are read and stored the instructions in the storage unit or random-access memory (RAM) 404. The storage unit 210 may provide a space for keeping static data where at least some instructions could be stored for later execution. The stored instructions may be further compiled to generate other representations of the instructions and dynamically stored in the RAM 404. The one or more hardware processors 114 may read instructions from the RAM 404 and perform actions as instructed.

The computer system may further include an output device 406 to provide at least some of the results of the execution as output including, but not limited to, validation of the one or more orchestration platforms, one or more microservice container images deployment status and the like. The output device 406 may include a display on computing devices and virtual reality glasses. For example, the display may be a mobile phone screen or a laptop screen. Graphical User Interfaces (GUIs) and/or text may be presented as an output on the display screen. The computer system may further include an input device 408 to provide the one or more users or another device with mechanisms for entering data and/or otherwise interacting with the computer system. The input device 408 may include, for example, a keyboard, a keypad, a mouse, or a touchscreen. Each of these output devices 406 and input device 408 may be joined by one or more additional peripherals.

A network communicator 410 may be provided to connect the computer system to a network and in turn to other devices connected to the network including other entities, servers, data stores, and interfaces. The network communicator 410 may include, for example, a network adapter such as a LAN adapter or a wireless adapter. The computer system may include a data sources interface 412 to access a data source 414. The data source 414 may be an information resource about the one or more microservice container images, and the one or more orchestration platforms. As an example, the one or more databases 108 of exceptions and rules may be provided as the data source 414. Moreover, knowledge repositories and curated data may be other examples of the data source 414. The data source 414 may include libraries containing, but not limited to, action sequences, cryptographic security policies, historical data, and other essential information. Moreover, the data sources interface 412 enables the system 102 to dynamically access and update these data repositories as new update version of the one or more orchestration platform and the one or more microservice container images are collected, analyzed, and utilized.

Numerous advantages of the present disclosure may be apparent from the discussion above. In accordance with the present disclosure, the system provides the trustworthy access enforcement to the one or more microservice container images on the one or more orchestration platforms. The system enhances security by ensuring that only authenticated and authorized one or more microservice container images are executed, thereby preventing unauthorized access and execution of potentially malicious images. By utilizing robust attestation mechanisms and cryptographic hash functions, the system ensures the integrity of the one or more microservice container images, enabling detection of any unauthorized modifications.

Additionally, the dynamic generation of the ESS data based on unique identifiers, such as The cluster ID hashes and MAC addresses, allows for fine-grained access control tailored to the associated orchestration platform of the one or more orchestration platform. The adaptability not only streamlines deployment processes of the one or more microservice container images but also enhances compliance with software licensing agreements by mitigating risks associated with unauthorized one or more microservice container images duplication or usage beyond the agreed terms. Moreover, the integration of the attestation & entitlement bootstrap service simplifies the management of security credentials, enabling seamless updates and revalidations as orchestration platforms evolve.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

What is claimed is:

1. A computer-implemented method for providing trustworthy access enforcement to one or more microservice container images on one or more orchestration platforms, comprising:

generating, by one or more developer hardware units through a container image generation module, the one or more microservice container images along with pre-defined hardcoded elements to identify metadata associated with the one or more orchestration platforms at a time of execution of the one or more microservice container images;

creating, by the one or more developer hardware units through a hash data creation module, a pre-defined hash data based on at least one of: a registry location of the one or more microservice container images and an updated version of the one or more microservice container images;

storing, by the one or more developer hardware units through a hardware security module, the created pre-defined hash data along with at least one of: the registry location of the one or more microservice container images and the updated version of the one or more microservice container images in one or more key management databases to analyze authenticity and integrity of the one or more orchestration platforms;

executing, by one or more hardware processors through a microservice execution subsystem, the one or more microservice container images on a cluster of master nodes associated with the one or more orchestration platforms;

obtaining, by the one or more hardware processors through a metadata-obtaining subsystem, the metadata associated with the one or more orchestration platforms at the time of execution of the one or more microservice container images;

generating, by the one or more hardware processors through a hash generation subsystem, entitlement signature secret (ESS) data based on hash data of an associated orchestration platform of the one or more orchestration platforms by aggregating the received metadata;

performing, by the one or more hardware processors through a signature authentication subsystem, a comparative analysis between the generated entitlement signature secret (ESS) data and the pre-defined hash data, to authenticate the associated orchestration platform of the one or more orchestration platforms as one of: benign and malicious; and providing, by the one or more hardware processors through an access control subsystem, one of: access control and deny control based on an outcome of the authentication as one of: the benign and the malicious, for trustworthy access enforcement of the one or more microservice container images on the one or more orchestration platforms.

2. The computer-implemented method of claim 1, wherein generating the one or more microservice container images by the one or more developer hardware units comprises at least one of: a continuous integration and continuous deployment (CI/CD) pipeline, build servers, and developer workstations.

3. The computer-implemented method of claim 1, wherein the metadata comprises at least one of: a cluster universally unique identifier (UUID), hardware addresses of the cluster of master nodes, updated version information of the one or more orchestration platforms, and a product name of the one or more orchestration platform.

4. The computer-implemented method of claim 1, further comprising:

digitally signing, by the hardware security module, the pre-defined hash data with one or more container image signatures, the pre-defined hash data comprises cryptographic hash functions for ensuring tamper-evident tracking of the one or more microservice container images on the one or more orchestration platforms.

5. The computer-implemented method of claim 1, further comprising:

authenticating, by the microservice execution subsystem, the integrity of the one or more microservice container images prior to execution, by cross-referencing the one or more container image signatures with the pre-defined hash data stored in the one or more key management databases.

6. The computer-implemented method of claim 1, further comprising:

inserting, by the one or more hardware processors through a hash insertion subsystem, the pre-defined hash data into the one or more orchestration platforms at an initial registration of the one or more orchestration platforms, the insertion of the pre-defined hash data into the one or more orchestration platforms allows the signature authentication subsystem to compare the generated entitlement signature secret (ESS) data and the pre-defined hash data at the time of execution of the one or more microservice container images.

7. The computer-implemented method of claim 1, wherein generating the entitlement signature secret (ESS) data using a combination of at least one of: the cluster universally unique identifier (UUID), a set of MAC addresses associated with one or more master nodes of the one or more orchestration platforms, the updated version information of the one or more orchestration platforms, the product name of the one or more orchestration platform, a concatenated hash of Trusted Platform Module (TPM) identities of the cluster of master nodes, an external identity key integrated with a Key Management Service (KMS), and the external identity key stored in the one or more key management databases.

8. The computer-implemented method of claim 1, further comprising:

determining, by the signature authentication subsystem, the associated orchestration platform of the one or more orchestration platforms as malicious based on at least one of:

an incompatibility of the generated entitlement signature secret (ESS) data with the pre-defined hash data;

an absence of the one or more container image signatures in the generated entitlement signature secret (ESS) data; and a rejection of the authentication by the generated entitlement signature secret (ESS) data.

9. A computer-implemented system for providing trustworthy access enforcement to one or more microservice container images on one or more orchestration platforms, comprising:

one or more developer hardware units associated with one or more service providers, contain a set of programable instructions in form of a plurality of modules to be executed by the one or more developer hardware units, the plurality of modules comprises:

a container image generation module configured to generate the one or more microservice container images along with pre-defined hardcoded elements for identifying metadata associated with the one or more orchestration platforms at a time of execution of the one or more microservice container images; and a hash data creation module configured to create a pre-defined hash data based on at least one of: a registry location of the one or more microservice container images and an updated version of the one or more microservice container images;

a hardware security module configured to store the created pre-defined hash data along with at least one of: the registry location of the one or more microservice container images and the updated version of the one or more microservice container images in one or more key management databases for analyzing authenticity and integrity of the one or more orchestration platforms; and one or more servers, comprising:

one or more hardware processors; and a memory unit operatively connected to the one or more hardware processors, wherein the memory unit comprises a set of computer-readable instructions in form of a plurality of subsystems, configured to be executed by the one or more hardware processors, wherein the plurality of subsystems comprises:

a microservice execution subsystem configured to execute the one or more microservice container images on a cluster of master nodes associated with the one or more orchestration platforms;

a metadata-obtaining subsystem configured to obtain the metadata associated with the one or more orchestration platforms at the time of execution of the one or more microservice container images;

a hash generation subsystem configured to generate entitlement signature secret (ESS) data based on hash data of an associated orchestration platform of the one or more orchestration platforms by aggregating the received metadata;

a signature authentication subsystem configured to perform a comparative analysis between the generated entitlement signature secret (ESS) data and the pre-defined hash data, for authenticating the associated orchestration platform of the one or more orchestration platforms as one of: benign and malicious; and an access control subsystem configured to provide one of: access control and deny control based on an outcome of the authentication as one of: the benign and the malicious, for trustworthy access enforcement of the one or more microservice container images on the one or more orchestration platforms.

10. The computer-implemented system of claim 9, wherein the one or more developer hardware units comprise at least one of: a continuous integration and continuous deployment (CI/CD) pipeline, build servers, and developer workstations.

11. The computer-implemented system of claim 9, wherein the metadata comprises at least one of: a cluster universally unique identifier (UUID), hardware addresses of the cluster of master nodes, updated version information of the one or more orchestration platforms, and a product name of the one or more orchestration platform.

12. The computer-implemented system of claim 9, wherein the pre-defined hash data is digitally signed with one or more container image signatures by the hardware security module, the pre-defined hash data comprises cryptographic hash functions, ensuring tamper-evident tracking of the one or more microservice container images on the one or more orchestration platforms.

13. The computer-implemented system of claim 9, wherein the microservice execution subsystem is further configured to authenticate the integrity of the one or more microservice container images prior to execution, by cross-referencing the one or more container image signatures with the pre-defined hash data stored in the one or more key management databases.

14. The computer-implemented system of claim 9, wherein the plurality of subsystems further comprises a hash insertion subsystem, the hash insertion subsystem is configured to insert the pre-defined hash data into the one or more orchestration platforms at an initial registration of the one or more orchestration platforms with the computer-implemented system, the insertion of the pre-defined hash data into the one or more orchestration platforms is configured to allow the signature authentication subsystem to compare the generated entitlement signature secret (ESS) data and the pre-defined hash data at the time of execution of the one or more microservice container images.

15. The computer-implemented system of claim 9, wherein the hash generation subsystem is configured to generate the entitlement signature secret (ESS) data using a combination of at least one of: the cluster universally unique identifier (UUID), a set of MAC addresses associated with one or more master nodes of the one or more orchestration platforms, the updated version information of the one or more orchestration platforms, the product name of the one or more orchestration platform, a concatenated hash of Trusted Platform Module (TPM) identities of the cluster of master nodes, an external identity key integrated with a Key Management Service (KMS), and the external identity key stored in the one or more key management databases.

16. The computer-implemented system of claim 9, wherein the signature authentication subsystem further configured to determine the associated orchestration platform of the one or more orchestration platforms as malicious based on at least one of:

an incompatibility of the generated entitlement signature secret (ESS) data with the pre-defined hash data;

an absence of the one or more container image signatures in the generated entitlement signature secret (ESS) data;

a rejection of the authentication by the generated entitlement signature secret (ESS) data.

17. A non-transitory computer-readable storage medium storing computer-executable instructions that, when executed by one or more hardware processors, cause the one or more hardware processors to perform operations for providing trustworthy access enforcement of one or more microservice container images on one or more orchestration platforms, the operations comprising:

generating the one or more microservice container images along with pre-defined hardcoded elements to identify metadata associated with the one or more orchestration platforms at a time of execution of the one or more microservice container images;

creating a pre-defined hash data based on at least one of: a registry location of the one or more microservice container images and an updated version of the one or more microservice container images;

storing the created pre-defined hash data along with at least one of: the registry location of the one or more microservice container images and the updated version of the one or more microservice container images in one or more key management databases to analyze authenticity and integrity of the one or more orchestration platforms;

executing the one or more microservice container images on a cluster of master nodes associated with the one or more orchestration platforms;

obtaining the metadata associated with the one or more orchestration platforms at the time of execution of the one or more microservice container images;

generating entitlement signature secret (ESS) data based on hash data of an associated orchestration platform of the one or more orchestration platforms by aggregating the received metadata;

performing a comparative analysis between the generated entitlement signature secret (ESS) data and the pre-defined hash data, to authenticate the associated orchestration platform of the one or more orchestration platforms as one of: benign and malicious; and providing one of: access control and deny control based on an outcome of the authentication as one of: the benign and the malicious, for trustworthy access enforcement of the one or more microservice container images on the one or more orchestration platforms.

18. The non-transitory computer-readable storage medium of claim 17, wherein generating the one or more microservice container images by the one or more developer hardware units comprises at least one of: a continuous integration and continuous deployment (CI/CD) pipeline, build servers, and developer workstations.

19. The non-transitory computer-readable storage medium of claim 17, wherein the metadata comprises at least one of: a cluster universally unique identifier (UUID), hardware addresses of the cluster of master nodes, updated version information of the one or more orchestration platforms, and a product name of the one or more orchestration platform.

20. The non-transitory computer-readable storage medium of claim 17, further comprising:

determining the associated orchestration platform of the one or more orchestration platforms as malicious based on at least one of:

an incompatibility of the generated entitlement signature secret (ESS) data with the pre-defined hash data;

an absence of the one or more container image signatures in the generated entitlement signature secret (ESS) data; and a rejection of the authentication by the generated entitlement signature secret (ESS) data.

\* \* \* \* \*